United States Patent
Wilson

(10) Patent No.: US 6,498,883 B1
(45) Date of Patent: Dec. 24, 2002

(54) OPTICAL FIBER RIBBON WITH PIGMENTED MATRIX MATERIAL AND PROCESSES FOR MAKING SAME

(75) Inventor: Daniel A. Wilson, Cincinnati, OH (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 10/115,076

(22) Filed: Apr. 4, 2002

Related U.S. Application Data

(60) Provisional application No. 60/281,379, filed on Apr. 5, 2001.

(51) Int. Cl.[7] .................................................. G02B 6/44
(52) U.S. Cl. ....................................................... 385/114
(58) Field of Search ................................ 385/114, 128; 522/39, 64, 75, 81, 83, 18, 96, 103

(56) References Cited

U.S. PATENT DOCUMENTS

| | | |
|---|---|---|
| 4,844,604 A | 7/1989 | Bishop et al. |
| 5,534,559 A | 7/1996 | Leppard et al. |
| 6,130,980 A | 10/2000 | Murphy et al. |
| 6,136,880 A | 10/2000 | Snowwhite et al. .............. 385/106 |
| 6,195,491 B1 * | 2/2001 | Jackson et al. .............. 385/106 |
| 6,362,249 B2 * | 3/2002 | Chawla ....................... 522/116 |
| 6,381,390 B1 * | 4/2002 | Hutton et al. ................ 385/114 |
| 2001/0048797 A1 * | 12/2001 | Van Dijk et al. ........... 385/114 |

FOREIGN PATENT DOCUMENTS

| | | | |
|---|---|---|---|
| JP | 08-171033 | * | 7/1996 |
| WO | 9142889 | | 5/1997 |
| WO | 9718493 | | 5/1997 |
| WO | 9719029 | | 5/1997 |

* cited by examiner

Primary Examiner—Susan Berman
(74) Attorney, Agent, or Firm—Stevens, Davis, Miller & Mosher, LLP

(57) ABSTRACT

Optical fiber ribbon, and a process for making same, that employs radiation-curable, colored matrix material and comprises a plurality of colored optical fibers in a fixed arrangement, preferably parallel to one another, embedded within the cured matrix material. The colored matrix material is opaque, thereby providing a wider variety of distinguishable matrix colors and hiding bleed-through from ink on coated optical fibers.

49 Claims, No Drawings

US 6,498,883 B1

OPTICAL FIBER RIBBON WITH PIGMENTED MATRIX MATERIAL AND PROCESSES FOR MAKING SAME

This claims priority from U.S. provisional patent application Ser. No. 60/281,379 filed Apr. 5, 2001, incorporated herein by reference in its entirety.

BACKGROUND OF THE INVENTION

I. Field of the Invention

The present invention relates to optical fibers embedded in ribbon matrix materials; to optical fiber ribbon arrays containing such matrix materials; and to processes for preparing same.

II. Description of the Prior Art

In certain applications, such as in short haul fiber-to-the-home uses, a single coated optical fiber may adequately transmit a signal from one point to the next. In most embodiments, however, a relatively large number of fibers are necessary to transmit a large volume of signals. For example, the telecommunications industry often requires aggregates of fibers spanning oceans or continents and containing dozens of individual fibers. Fibers are conveniently aggregated into cables, wherein large numbers of coated optical fibers are laid in parallel and are protected by a common sheathing material which may include fiberglass, steel tape and reinforced rubber cabling material.

When numerous individual coated optical fibers are aggregated into a cable, it is necessary to be able to identify each of the individual fibers. For example, when two cable segments are to be spliced together, it is necessary to splice together ends of each like optical fiber in order for a signal to convey properly. When only a few fibers are contained in a cable, identification is facilitated by coating each individual fiber with a characteristic color. Thereby, the splicer may simply match up green fiber to green fiber, red to red, and so forth.

When the cable contains one hundred or more fibers, however, it becomes difficult to impart a sufficient number of distinctive inks to color each fiber distinguishably. Thus, a geometric means of distinguishing the fibers is also used. For example, it is known to arrange the fibers in a number of layers or two-dimensional fiber arrays with each layer or array containing perhaps twelve ink-coated fibers of different colors. These. layers or arrays are stacked one atop the other to form three-dimensional structures known in the art as ribbons. The ribbons greatly facilitate matching up fibers when splicing.

The matrix material of the ribbons should, inter alia, have suitable glass transition temperature; cure rapidly; be non-yellowing; and have high thermal, oxidative and hydrolytic (moisture) stability. Further, the matrix material must possess solvent resistance, inasmuch as splicers typically remove residual matrix and coating material from stripped fibers using a solvent such as trichloroethane or ethanol or isopropanol or other commercially available solvent. Additionally, the matrix material must adhere sufficiently to the coated, colored optical fibers to prevent separation of the fibers during processing into cables, but not adhere so much as to remove the ink or other coloration from the individual fibers when the matrix material is stripped from the fibers to permit splicing. Removal of an ink layer from a fiber is referred to in the industry as "breakout failure." It makes identification of the individual fibers nearly impossible. Also, the matrix material should be removable via thermal stripping at commonly-used stripping temperatures. Finally, the matrix and all underlying coatings contained within the ribbon should be removable in an intact tube, leaving a minimal amount of residue on the fibers.

Like individual fibers, individual ribbons are color-coded with inks, pigments or dyes. (Pigments are used in suspension; dyes are used in solution.) The prior art, however, offers ribbons that contain lower levels of pigment and are therefore too transparent, making color identification and differentiation difficult. Further, the pigments, dyes or inks in the color-coded optical fibers inside the ribbons tend to bleed, and prior art ribbons cannot adequately hide the bleed-through because they are insufficiently opaque.

The colors and opacity of the ribbons have been limited by the fact that pigments (or other colored materials) interfere with curing of the matrix material. Matrix material is typically cured when UV light is absorbed by photoinitiators in the matrix material. Pigments reduce the light that can be absorbed by the photoinitiator.

Incomplete cure causes many problems, including poor thermal strippability, reduced toughness, tackiness, odor and residual extractable material after curing. These problems have been addressed in the past by adding high levels of short-wavelength—absorbing photoinitiators, but this approach cannot be used in thicker films because high levels of these photoinitiators also reduce light penetration. Specifically, light absorption by photoinitiator in the upper layer of the film decreases the light reaching the bottom of the film, and inadequate cure at the bottom layer of the matrix profoundly affects ribbon performance. Of course, it helps to increase the curing time, but this slows production significantly.

Accordingly, there is a need in the art for matrix material that contains pigment, dyes, inks or other colored substances suitable to impart a variety of colors of sufficient opacity without thereby hampering cure, especially deep within the matrix film.

SUMMARY OF THE INVENTION

The invention provides: (1) a radiation-curable matrix material for affixing coated and colored optical fibers in a ribbon configuration containing at least two optical fibers, the matrix material exhibiting particular characteristics as defined below; (2) an optical fiber ribbon employing such matrix material and comprising a plurality of optical fibers in a fixed arrangement, preferably parallel to one another, within the cured matrix material; (3) a process for preparing an optical fiber ribbon using the aforesaid matrix material; and (4) a radiation-curable matrix composition including the same ingredients as the aforesaid matrix material and exhibiting similar characteristics.

Generally, the matrix material imparts sufficient opacity without causing problems with cure, strippability, adhesion to colored fibers, tackiness, odor, extractables and other requisite properties of matrix material. More specifically, after curing, the matrix material produces the following inside degrees of cure, hue angle ranges, minimum contrast ratios, lightness ranges and chroma values, measured as described below.

A 100 micron thick by 80 mm wide by 120 mm long sample of the matrix material exhibits an inside degree of cure of more than about 70 percent when cured with a radiation dose of about 0.2 J/cm$^2$, preferably more than about 80 percent, most preferably more than about 85 percent. The values for degree of cure were determined by measuring, in samples of the matrix material as cured on glass plates about 6 mm thick, the percent reacted acrylate unsaturation (%RAU) via FTIR—ATR using a diamond crystal ATR attachment. By an inside degree of cure it is meant the degree of cure of a bottom surface of the sample after curing. The cured samples were 100 microns thick, 80 mm wide and 120 mm long. The acrylate analytical peak was 1410 cm$^{-1}$ and the reference peak was 1520 cm$^{-1}$. For non-acrylated materials (i.e., vinyl or other functional groups capable of reacting with a free radical), an alternative method may be used, but more than about 70 percent of the total reactive groups should still undergo reaction at this cure dose.

A 25 micron thick by 75 mm wide by 180 mm long sample film of the cured matrix material exhibits a hue angle range which, when determined by means for spectrophotometrically analyzing, has the following values for each respectively colored matrix material: blue is about 230 to about 270; orange is about 55 to about 80; green is about 120 to about 185; brown is about 35 to about 80; slate is about 0 to about 360; white is about 0 to about 360; red is about 325 to about 50; black is about 0 to about 360; yellow is about 80 to about 120; violet is about 270 to about 325; rose is about 0 to about 22; and aqua is about 184 to about 230. Preferably, however, the 25 micron sample exhibits a hue angle range having the following values for each respectively colored matrix: blue is about 230 to about 260; orange is about 55 to about 75; green is about 120 to about 150; brown is about 50 to about 80; slate is about 30 to about 220; white is about 85 to about 153; red is about 0 to about 50; black is about 3 to about 113; yellow is about 90 to about 115; violet is about 290 to about 325; rose is about 5 to about 22; and aqua is about 184 to about 210. More preferably, the 25 micron sample exhibits a hue angle range having the following values for each respectively colored matrix: blue is about 233 to about 250; orange is about 61 to about 69; green is about 120 to about 143; brown is about 58 to about 78; slate is about 69 to about 190; white is about 100 to about 138; red is about 19 to about 31; black is about 18 to about 98; yellow is about 99 to about 112; violet is about 292 to about 324; rose is about 7 to about 22; and aqua is about 184 to 202.

The foregoing hue angle ranges were determined by spectrophotometrically analyzing 25 micron thick by 75 mm wide by 180 mm long samples of the matrix material as cured underneath a 150 micron layer of a UV-curable coating which is substantially free of chromophores. Such a clear coating is described in Table 6. Means for spectrophotometrically analyzing is limited to using a spectrophotometer in which the samples are measured on top of a white background tile (Hunter Lab #C2-1186) and the spectrophotometer has the following settings: Illuminant=C, Observer=2 degrees, Spectral Component=Excluded. Means for spectrophotometrically analyzing is limited as above only for purposes of defining and standardizing the physical characteristics exhibited by the inventive matrix material.

A 100 micron thick by 80 mm wide by 120 mm long sample of the cured matrix material also exhibits a minimum contrast ratio, as measured via a modified version of ASTM D2805-88, having the following minimum values for each respectively colored matrix material: blue is about 42; orange is about 30; green is about 8; brown is about 22; slate (gray) is about 24; white is about 36; red is about 30; black is about 3; yellow is about 27; violet is about 16; rose is about 37; and aqua is about 35. Preferably, however, the sample exhibits the following minimum values: blue is about 64; orange is about 46; green is about 12; brown is about 33; slate (gray) is about 36; white is about 55; red is about 46; black is about 5; yellow is about 41; violet is about 25; rose is about 56; and aqua is about 53. More preferably, the 100 micron sample exhibits a minimum contrast ratio having the following values for each respectively colored matrix: blue is about 71; orange is about 51; green is about 14; brown is about 37; slate is about 40; white is about 61; red is about 51; black is about 6; yellow is about 46; violet is about 28; rose is about 63; and aqua is about 59.

In a preferred embodiment, a 25 micron thick by 75 mm wide by 180 mm long sample of the cured matrix, when placed under a clear 150 micron thick UV-curable coating which is substantially free of chromophores, exhibits a lightness range, as determined by the means for spectrophotometrically analyzing, having the following values for each respectively colored matrix: blue is about 55 to about 80; orange is about 57 to about 82; green is about 70 to about 95; brown is about 54 to about 79; slate is about 61 to about 86; white is about 78 to about 98; red is about 46 to about 71; black is about 60 to about 85; yellow is about 73 to about 98; violet is about 60 to about 85; rose is about 59 to about 84; and aqua is about 67 to about 92. More preferably, the 25 micron sample exhibits a lightness range having the following values for each respectively colored matrix: blue is about 60 to about 80; orange is about 60 to about 80; green is about 75 to about 95; brown is about 59 to about 79; slate is about 66 to about 86; white is about 83 to about 98; red is about 51 to about 71; black is about 60 to about 80; yellow is about 80 to about 95; violet is about 65 to about 85; rose is about 62 to about 82; and aqua is about 72 to about 87. Most preferably, the 25 micron sample exhibits a lightness range having the following values for each respectively colored matrix: blue is about 63 to about 75; orange is about 66 to about 77; green is about 79 to about 90; brown is about 62 to about 74; slate is about 70 to about 81; white is about 91 to about 98; red is about 55 to about 66; black is about 67 to about 80; yellow is about 85 to about 93; violet is about 71 to about 82; rose is about 64 to about 79; and aqua is about 76 to about 87. These lightness ranges were determined in essentially the same manner as the hue angles.

In another preferred embodiment, a 25 micron thick by 75 mm wide by 180 mm long sample of the cured matrix, when placed under a clear 150 micron thick UV-curable coating which is substantially free of chromophores, exhibits the following chroma values, as determined by the means for spectrophotometrically analyzing, for each respectively colored matrix: blue is greater than about 18; orange is greater than about 48; green is greater than about 12; brown is greater than about 18; slate is about 0 to about 10; white is about 0 to about 12; red is greater than about 31; black is about 0 to about 10; yellow is greater than about 39; violet is greater than about 8; rose is greater than about 18; and aqua is greater than about 15. More preferably, the 25 micron sample exhibits the following chroma values for each respectively colored matrix: blue is greater than about 28; orange is greater than about 72; green is greater than about 13.5; brown is greater than about 25; slate is about 0 to about 7; white is about 0 to 11; red is greater than about 48; black is about 0 to about 5; yellow is greater than about 51; violet is greater than about 11; rose is greater than about 21; and aqua is greater than about 19. These chroma values were determined in essentially the same manner as the hue angles and lightness values.

The matrix material exhibiting the characteristics described in the foregoing paragraphs comprises a base resin blend, a photoinitiator or photoinitiator blend, an opacifier blend and one or more color blends, such as a pigmented letdown blend. More specifically, the matrix material is formed from a reactive mixture comprising:

(a) about 85 to about 99.7 percent by weight of a base resin, preferably about 87 to about 99.7 percent, more preferably about 87 to about 95 percent;

(b) about 0.1 to about 10 percent by weight of a photoinitiator that absorbs light in the wavelength region above about 400 nm, preferably about 0.25 to about 7 percent, more preferably about 0.5 to about 6 percent;

(c) about 0.1 to about 10 percent by weight of an opacifier blend, preferably about 0.1 to about 4 percent, more preferably about 0.5 to about 3.5 percent, except that for black matrix material the opacifier blend is optional; and (d) about 0.1 to about 10 percent by weight of at least one color blend, preferably 0.5 to about 5 percent of a pigment blend, more preferably about 0.6 to about 4 percent of a pigment blend;

wherein all of the percentages by weight are based on the total weight of (a), (b), (c) and (d).

The matrix material typically comprises 1–5 different pigment blends, depending on the desired final color. Most colors are obtained with one or two pigment blends. Actual dry pigment compounds, as opposed to other compounds in a pigment blend, shall be referred to as "pigment compounds."

The base resin may comprise:

(a) about 30 percent to about 80 percent by weight of one or more acrylated, methacrylated or vinyl functional oligomers with a chemical backbone based on an aliphatic urethane oligomer or epoxy oligomer, or a combination thereof, preferably about 40 to about 70 percent, more preferably about 40 to about 60 percent;

(b) from about 10 percent to about 75 percent by weight, for example about 14 to about 18 percent, preferably from about 10 percent to about 65 percent by weight, of one or more reactive diluent monomers having about 1 to about 5 functional groups, more preferably about 35 to about 45 percent, for example about 40 percent;

wherein the percentages of (a) and (b) by weight are based on the total weight of (a) and (b).

More preferably, the base resin of the matrix material comprises:

(a) about 40 to about 60 percent by weight of one or more acrylated, methacrylated or vinyl functional oligomers with a chemical backbone based on an aliphatic urethane oligomer;

(b) about 35 to about 45 percent by weight of one or more reactive diluent monomers having about 1 to about 5 acrylate, methacrylate, vinyl ether or vinyl functional groups, more preferably about 20 to about 25 percent by weight of isobornyl acrylate and about 35 to about 45 percent of an isocyanurate acrylate, for example an isocyanurate triacrylate, most preferably about 35 to about 45 percent of tris-hydroxyethyl isocyanurate triacrylate; and wherein all of the percentages of (a) and (b) by weight are based on the total weight of (a) and (b).

In the present specification all compositional percentages are by weight unless otherwise indicated.

The photoinitiator is capable of absorbing light in the wavelength region above about 400 nm. Preferably, the photoinitiator has an absorption value of at least about 0.1 at 400 nm, typically at least about 1 or 1.5 at 400 nm, when present at a concentration of about 0.1% by weight in a solvent which does not absorb light of this wavelength, the solution being present in a container transparent to light of this wavelength and providing a path length of 1.0 centimeters. Moreover, it may have an absorption value of greater than about 1 at 325 nm, typically greater than about 2 at 325 nm, when measured under these same conditions. Examples of suitable solvents include methanol and acetonitrile. The absorption value may be measured via any commercially available UV-Visible spectrophotometer such as the Lambda Series available from Perkin Elmer, Shelton, Conn. or the Cary Series available from Varian, Inc. Mulgrave, Victoria, Australia.

More preferably, the photoinitiator is a bis-acyl phosphine oxide photoinitiating compound. One or more other photoinitiator compounds may also be present. While different absorption values have been given, it must be noted that absorption herein, is defined as absorbing any amount of light. The threshold for absorption value, unless specifically defined, is assumed to be limited only by the features of the measuring device.

The opacifier blend may comprise opacifying compounds such as $TiO_2$, $BaSO_4$, $ZnO$ or $ZnS$, preferably about 40 to about 50 percent of the weight of the opacifier blend is $TiO_2$. An opacifier blend is less preferable when the matrix material is black.

The matrix material may also contain various additives, stabilizers and release agents. For example, it may contain from about 0.1 percent to about 10 percent by weight of an additive to provide adequate surface slip and release. It may also contain from about 0.1 percent to about 2 percent by weight of stabilizer or antioxidant compounds such as tertiary amines; hindered amines; organic phosphites; hindered phenols or hydrocinnamates; propionates and mixtures thereof. Preferably the stabilizer or antioxidant compounds are selected from the group consisting of hindered phenols, hydrocinnamates and mixtures thereof.

In a preferred embodiment, the invention comprises an optical fiber ribbon employing the matrix material above and having at least two optical fibers in a fixed arrangement, preferably parallel to one another, within the cured matrix material.

In an alternative embodiment, the invention comprises a process for preparing an optical fiber ribbon which includes the steps of (1) mechanically arranging coated and inked optical fibers in a generally parallel arrangement relative to each other; (2) applying about the fibers the liquid form of the radiation-curable matrix material; and (3) curing the matrix, thereby securing said fibers in said arrangement. The curing may be effected by electron beam irradiation or by ultraviolet irradiation, preferably the latter.

In another alternative embodiment, the invention comprises a radiation-curable matrix composition including the ingredients in the matrix material described above and exhibiting the characteristics listed above.

DESCRIPTION OF THE PREFERRED EMBODIMENTS

A radiation-curable matrix material has been devised to exhibit a number of important characteristics rendering it useful for affixing coated and inked or otherwise colored optical fibers in a ribbon configuration. These characteristics generally include opacity; diversity of coloration; moisture resistance; solvent resistance; adequate adhesion level; ease of stripping; resistance to breakout failure; low volatiles content; fast cure; non-yellowing; tolerance of cabling; thermal, oxidative and hydrolytic stability, and so forth. The matrix is employed in an optical fiber ribbon that comprises a plurality of optical fibers in a fixed arrangement, preferably parallel to one another, within the cured matrix material. Also disclosed is a process for preparing an optical fiber ribbon using the aforesaid matrix material which matrix material exhibits the characteristics as defined below.

Radiation-Curable Matrix Material

The invention relates in part to a radiation-curable matrix material. After curing, the matrix material preferably produces the following hue angle ranges, lightness values and chroma values, measured as described below, for each of twelve colors. In Table 1, Adeq stands for adequate, Pref stands for preferred and M. Pref stands for most preferred.

TABLE 1

Hue, Lightness and Chroma Values Exhibited by Matrix Material

| Color | Hue Angle (25 micron film) | | | Lightness (25 micron film) | | | Chroma (25 micron film) | |
|---|---|---|---|---|---|---|---|---|
| | Adeq. | Pref. | M. Pref. | Adeq. | Pref. | M. Pref | Pref. | M. Pref. |
| Blue | 230–270 | 230–260 | 233–250 | 55–80 | 60–80 | 63–75 | >18 | >28 |
| Orange | 55–80 | 55–75 | 61–69 | 57–82 | 60–80 | 66–77 | >48 | >72 |
| Green | 120–185 | 120–150 | 120–143 | 70–95 | 75–95 | 79–90 | >12 | >13.5 |
| Brown | 35–80 | 50–80 | 58–78 | 54–79 | 59–79 | 62–74 | >18 | >25 |
| Slate | 0–360 | 30–220 | 69–190 | 61–86 | 66–86 | 70–81 | 0–10 | 0–7 |
| White | 0–360 | 85–153 | 100–138 | 78–98 | 83–98 | 91–98 | 0–12 | 0–11 |
| Red | 325–50 | 0–50 | 19–31 | 46–71 | 51–71 | 55–66 | >31 | >48 |
| Black | 0–360 | 3–113 | 18–98 | 60–85 | 60–80 | 67–80 | 0–10 | 0–5 |
| Yellow | 80–120 | 90–115 | 99–112 | 73–98 | 80–95 | 85–93 | >39 | >51 |
| Violet | 270–325 | 290–325 | 292–324 | 60–85 | 65–85 | 71–82 | >8 | >11 |
| Rose | 0–22 | 5–22 | 7–22 | 59–84 | 62–82 | 64–79 | >18 | >21 |
| Aqua | 184–230 | 184–210 | 184–202 | 67–92 | 72–87 | 76–87 | >15 | >19 |

The foregoing hue angles, lightness values and chroma values were determined by analyzing 25 micron thick by 75 mm wide by 180 mm long samples of the cured matrix material under 150 microns of the clear secondary coating described in Table 6. These values were analyzed with a means for spectrophotometrically analyzing. Means for spectrophotometrically analyzing is limited to using a spectrophotometer where the samples are measured on top of a white background tile (Hunter Lab #C2-1186) and the spectrophotometer has the following settings: Illuminant=C, Observer=2 degrees, Spectral Component=Excluded. All values are a reported average of a minimum of 3 measurements at different areas on the film. The hue angle range for red is about 325 to about 50 because these hue angles lie on a "circle of color" from 0 to 360 degrees. Red shades exist from 0 to 50 degrees and from 325 to 360 degrees. The shorthand for this range is 325 to 50 degrees.

The limitations that define a means for spectrophotometrically analyzing do not, of course, at all limit the ways in which the hue angles, lightness values and chroma values may be determined. Means for spectrophotometrically analyzing is limited as above only for purposes of defining and standardizing the physical characteristics exhibited by the inventive matrix material. Other means and methods of analyzing the samples will generate different results. However, such results should form a pattern of values that corresponds consistently and proportionally with the values determined by the means for spectrophotometrically analyzing.

After curing, the matrix material also preferably produces the following minimum contrast ratios and inside degrees of cure, measured as described below, for each of twelve colors. In Table 2, Adeq stands for adequate, Pref stands for preferred and M. Pref stands for most preferred.

TABLE 2

Contrast and Cure Exhibited by Matrix Material

| Color | Minimum Contrast Ratio (100 micron film) | | | Minimum Degree of Cure (% RAU - 100 micron film) | | |
|---|---|---|---|---|---|---|
| | Adeq. | Pref. | M. Pref. | Adeq. | Pref. | M. Pref. |
| Blue | 42 | 64 | 71 | >70% | >80% | >85% |
| Orange | 30 | 46 | 51 | >70% | >80% | >85% |
| Green | 8 | 12 | 14 | >70% | >80% | >85% |

TABLE 2-continued

Contrast and Cure Exhibited by Matrix Material

| Color | Minimum Contrast Ratio (100 micron film) | | | Minimum Degree of Cure (% RAU - 100 micron film) | | |
|---|---|---|---|---|---|---|
| | Adeq. | Pref. | M. Pref. | Adeq. | Pref. | M. Pref. |
| Brown | 22 | 33 | 37 | >70% | >80% | >85% |
| Slate | 24 | 36 | 40 | >70% | >80% | >85% |
| White | 36 | 55 | 61 | >70% | >80% | >85% |
| Red | 30 | 46 | 51 | >70% | >80% | >85% |
| Black | 3 | 5 | 6 | >70% | >80% | >85% |
| Yellow | 27 | 41 | 46 | >70% | >80% | >85% |
| Violet | 16 | 25 | 28 | >70% | >80% | >85% |
| Rose | 37 | 56 | 63 | >70% | >80% | >85% |
| Aqua | 35 | 53 | 59 | >70% | >80% | >85% |

A contrast ratio represents the ratio of the largest to the smallest luminance values of a material or image. The values for the minimum contrast ratio were determined by curing 100 micron thick by 80 mm wide by 120 mm films on glass plates, removing the films and placing them on a substrate conforming with ASTM D2805-88 with appropriate white and black sections and analyzing the samples of the cured matrix material on a model CS-5 spectrophotometer from Applied Color Systems with the following settings: Specular Component Excluded, 2 degree observer, C illuminant. Values for % reflectance were obtained for the film over the white background and over the black background from 400 to 700 nm at 20 nm intervals. While contrast ratio is defined as the ratio of the average reflectance of the film over the black background to the average reflectance of the film over the white background, as measured as a percentage (i.e., between 0 and 1.00), the contrast ratio values used herein, as reported by the CS-5 spectrophotomer, are achieved by multiplying the contrast ratio by 100 to achieve a number between 0 and 100. A description of the contrast ratio is given in ASTM standard D2805-88. In determining these values, a modified ASTM D2805-88 was employed.

By a modified ASTM D2805-88 method is meant a method modified for curing the films on a glass substrate followed by removing the film and spectrophotometrically analyzing on top of the appropriate background. The values were measured on a smooth surface paper chart, e.g., Form 2C Opacity chart from Leneta Co., Ho-Ho-Kus, N.J., as deemed appropriate by ASTM D2805-88, section 5.1.2. In contrast, the standard ASTM D2805-88 method includes applying the film directly on the chart and allowing the film to air dry. However, since the air dry method is inapplicable to the present invention, the method of applying the film to the substrate has been modified. The steps used to measure the contrast ratio after the film has been cured and secured to the substrate remain the same as those of the measurement procedure portion of ASTM D2805-88. For example, the substrate upon which the film is measured (after being removed from the glass substrate) is the substrate specified in ASTM D2805-88.

The values for the minimum degree of inside cure represent the percent reacted acrylate unsaturation (%RAU). They were determined by using FTIR-ATR (Fourier Transform Infrared Spectroscopy-Attenuated Total Reflectance) to analyze samples of the matrix material, as cured on a 6 mm glass plate with a radiation dose of about 0.2 J/cm$^2$. The method was used to determine the %RAU using a Nicolet Magna FTIR bench with Continuum microscope and a Spectra Tech Infinity Series diamond ATR attachment is described below.

The Nicolet Magna 860 was used with the following settings: number of scans=128; resolution=4; gain=4, velocity=1.89; aperture=100; beam splitter=KBr; and detector=MCT (mercury cadmium telluride). After the settings have been verified, a background spectrum is obtained by sliding the ATR objective into alignment slightly above the liquid sample.

Next, the uncured coating sample is prepared and the spectra obtained. For example, a single drop of liquid coating is placed on a slide. The drop is aligned below the crystal using a visual objective, then the ATR crystal is slid back to collect the spectrum. The stage is then raised until the spectrum appears on the screen. The spectrum is then collected, whereafter the stage is lowered and the diamond crystal is cleaned with methanol.

Then, a sample of the film prepared above is prepared and its spectrum is obtained. Such a sample is 100 microns thick, 80 mm wide and 120 mm long. The film is aligned using the visual objectives (15×Reflachromat) to get the sample close to the objective, whereafter the ATR crystal is swung underneath. The sample can then be generated and collected.

The measurement is completed by obtaining the peak areas. This may be accomplished by first, converting the liquid sample spectrum to absorbance, and using OMNIC software available from Nicolet, or any other method of calculating peak areas, calculating the areas under the peaks at 1410 cm$^{-1}$ and 1520 cm$^{-1}$ for both the liquid sample and the film sample.

Finally, the % RAU is calculated using the following formula:

$$\left[\frac{\text{area } 1410 \text{ cm}^{-1} \text{ liquid}}{\text{area } 1520 \text{ cm}^{-1} \text{ liquid}} - \frac{\text{area } 1410 \text{ cm}^{-1} \text{ film}}{\text{area } 1520 \text{ cm}^{-1} \text{ film}}\right] \div \frac{\text{area } 1410 \text{ cm}^{-1} \text{ liquid}}{\text{area } 1520 \text{ cm}^{-1} \text{ liquid}} \times 100$$

The samples were 100 microns thick, 80 mm wide and 120 mm long. The percent RAU was measured at the bottom surface of these samples. The curing unit used was a Fusion Systems with a 300 Watt/inch irradiator. A 9 millimeter diameter D bulb was used. The films were cured at a temperature of 25° C. allowed to condition for about 72 hours away from light at 50+/−10 percent RH and 23+/−2° C. However, in cases where materials other than acrylates are being cured, such as methacrylates or vinyls, the FTIR technique is modified for the particular peaks being monitored, but the resulting calculated percent reacted functional groups remain the same as used for acrylates.

The matrix material exhibiting the characteristics described above is comprised of a base resin blend, a photoinitiator or photoinitiator blend, an opacifier blend and one or more color blends.

More specifically, the matrix material comprises:

(a) about 80 to about 99.7 percent by weight of a base resin, preferably about 85 to about 99 percent, more preferably about 87 to about 95 percent;

(b) about 0.1 to about 10 percent by weight of a photoinitiator that absorbs light in the wavelength region above about 400 nm, preferably about 0.25 to about 7 percent, more preferably about 0.5 to about 6 percent;

(c) about 0.1 to about 10 percent by weight of an opacifier blend, preferably about 0.1 to about 4 percent, more preferably about 0.5 to about 3.5 percent, except that for black matrix material the opacifier blend is optional; and (d) about 0.1 to about 10 percent by weight of at least one color blend, preferably about 0.5 to about 5 percent of a pigment blend, more preferably about 0.6 to about 4 percent of a pigment blend;

wherein all of the percentages by weight are based on the total weight of (a), (b), (c) and (d).

I. Base Resin

The base resin may comprise:

(a) about 30 percent to about 80 percent by weight of one or more acrylated, methacrylated or vinyl functional oligomers with a chemical backbone based on an aliphatic urethane oligomer or epoxy oligomer, or a combination thereof, preferably about 40 to about 70 percent, more preferably about 40 to about 60 percent, for example about 48 to about 52 percent;

(b) from about 10 percent to about 75 percent, preferably from about 10 percent to about 65 percent, for example about 14 to about 18 percent, more preferably about 35 percent to about 45 percent, for example about 40 percent by weight of one or more reactive diluent monomers having about 1 to about 5 functional groups, preferably about 1 to about 5 acrylate, methacrylate, vinyl ether or vinyl functional groups, still more preferably about 20 to about 25 percent by weight of isobornyl acrylate and about 14 to about 18 percent of an isocyanurate acrylate, for example an isocyanurate triacrylate, most preferably about 14 to about 18 percent of tris-hydroxyethyl isocyanurate;

wherein the percentages of (a) and (b) by weight are based on the total weight of (a) and (b).

A most preferred base resin is described in Table 3.

TABLE 3

| | Preferred Base Resin | | |
|---|---|---|---|
| Product | % | Supplier | Description |
| PURELAST 590 | 19.26 | Polymer Systems Corp. Orlando, FL | Aliphatic Urethane Acrylate Oligomer |
| EBECRYL 270 | 31.28 | UCB Chemical Corp. Smyrna, GA | Aliphatic Urethane Acrylate Oligomer |

TABLE 3-continued

Preferred Base Resin

| Product | % | Supplier | Description |
|---|---|---|---|
| SR-368 | 16.28 | Sartomer Exton, PA | Tris-hydroxyethyl Isocynanurate Triacrylate |
| Isobornyl Acrylate | 23.83 | UCB Chemical Corp. Smyrna, GA | Isobornyl Acrylate Monomer |
| Percent Total: | 100.00 | | |

A. The Urethane Acrylate or Epoxy Acrylate Oligomer

Preferably, these oligomers are based on an aliphatic polyether polyol, which is reacted with an aliphatic polyisocyanate and then acrylated. They comprise from about 30 percent to about 80 percent by weight of the base resin.

Examples of suitable urethane acrylate and epoxy oligomers include but are not limited to PURELAST 586 and 590 series from Polymer Systems Corporation; PHOTOMER 6008 and 6019, both from Cognis Corporation (Ambler, Pa.); EBECRYL 264, 270, 4842, all from UCB Chemicals, Radcure Division (Smyrna, Ga.); CN 120, 934, 983, 990 all from Sartomer Corporation (Exton, Pa.); and UVE 150 from Croda Resins Ltd. (Belvedere, Kent, England).

B. The Monomer Having 1 to 5 Functional Groups

By themselves, typical acrylated urethanes and epoxy acrylate oligomers are too viscous for matrix materials. These reactive diluent monomers, which constitute from about 5 to about 65 percent, for example about 45 percent, by weight of the base resin (based on the total weight of the base resin ingredients), serve to dilute the matrix formulation. They have about 1 to about 5 functional groups, preferably about 1 to about 5 acrylate, methacrylate, vinyl ether or vinyl functional groups. However, all suitable monomers that react with the urethanes or epoxy oligomers and that have about 1 to about 5 functional groups may be used.

Monomers are suitable when they do not introduce volatile or extractable materials into the formulation and do not negatively affect other physical properties such as modulus, tensile strength, elongation to break, adhesion to various substrates, cure speed, etc. Such properties are known in the art. Preferably, the monomer diluent may be capable of lowering the viscosity of the uncured (liquid) composition to within the range of about 1,000 to about 10,000 cps (centipoises) at 25° C., preferably about 4,000 to about 8,000 cps, as measured by a Brookfield viscometer, Model LVT, spindle speed #34, at 25° C. If a viscosity higher than about 10,000 cps results, the liquid (uncured) composition including it may still be useful if certain processing modifications are effected (e.g., heating the dies through which the liquid coating composition is applied).

Examples of suitable monomers include but are not limited to isobornyl acrylate; $C_6$–$C_{12}$ hydrocarbon diol diacrylates; $C_6$–$C_{12}$ hydrocarbon diol dimethacrylates; tripropylene glycol diacrylate; tripropylene glycol dimethacrylate; neopentyl glycol, diacrylate; neopentyl glycol dimethacrylate; neopentyl glycol propoxylate diacrylate; neopentyl glycol propoxylate dimethacrylate; neopentyl glycol ethoxylate diacrylate; neopentyl glycol ethoxylate dimethacrylate; bisphenol A ethoxylate diacrylate; bisphenol A ethoxylate dimethacrylate; bisphenol A propoxylate diacrylate; bisphenol A propoxylate dimethacrylate; phenoxyethyl acrylate; phenoxyethyl methacrylate; phenoxyethyl ethoxylate acrylate; phenoxyethyl ethoxylate methacrylate; phenoxyethyl propoxylate acrylate; phenoxyethyl propoxylate methacrylate; polyethylene glycol nonylphenylether acrylate; polyethylene glycol nonylphenylether methacrylate; polypropylene glycol nonylphenylether acrylate; polypropylene glycol nonylphenylether methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; tetrahydrofurfuryl acrylate; tetrahydrofurfuryl methacrylate; isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; dicyclopentenyl propoxylate acrylate; dicyclopentenyl propoxylate methacrylate; N-vinyl amides and mixtures thereof. Most preferred compounds include isobornyl acrylate, isocyanurate acrylate and particularly tris-hydroxyethyl isocyanurate triacrylate.

II. The Photoinitiator

The second main component of the matrix material is a photoinitiator. Preferably, the photoinitiator constitutes a portion of the base resin. The conceptual separation herein of the photoinitiator and base resin is primarily for purposes of explication, and it is to be understood that in practice the photoinitiator and base resin may be combined prior to the mixing and reaction of the other components of the matrix material. It should also be understood that Applicant's statement(s) herein that the photoinitiator comprises a substance is often shorthand for stating that the base resin comprises a substance which affects or is affected by the photoinitiating compound and which might otherwise appear in a photoinitiator "blend."

The photoinitiator is capable of absorbing light in the wavelength region above about 400 nm. Moreover, it may have an absorption value of greater than about 1 at 325 nm when present at a concentration of about 0.1% by weight in a solvent which does not absorb light of this wavelength and a path length of 1.0 centimeters.

The photoinitiator must provide reasonable cure speed without causing premature gelation of the matrix composition. Further, the blend must be thermally stable.

The photoinitiator constitutes about 0.1 to about 10 percent by weight of the matrix material, preferably about 0.1 to about 4 percent, more preferably about 0.5 to about 3.5 percent, most preferably about 0.5 to 6 percent. If it exceeds 10 percent, it could interfere with cure near the bottom of the matrix film. In amounts less than 0.1 percent, however, it may not be able to adequately cure the outer or middle portions of the matrix film.

The photoinitiator preferably comprises one or more photoinitiating compounds. Preferred photoinitiating compounds absorb UV light in the wavelength region above about 325 nm, preferably above about 400 nm. Preferred photoinitiating compounds include IRGACURE-369, 819, 907 (2-methyl-1,4-(methyl thio)phenyl-2-morpholinopropanone-1), 1700 and DAROCUR-4265, all from Ciba Specialty Chemicals (Tarrytown, N.Y.), and LUCIRIN TPO (2,4,6-trimethylbenzoyldiphenylphosphine oxide); and TPO-L (2,4,6-trimethylbenzoylethoxyphenylphosphine oxide) (also known as 8893) from BASF Corporation (Charlotte, N.C.), or bis(2,6-dimethoxybenzoyl)-2,4,4-trimethylpentylphosphine oxide. The most preferred photoinitiating compound is IRGACURE-819, a bis-acyl phosphine oxide. Preferably, it comprises about 0.5 to about 6 percent of the weight of the base resin, most preferably about 2.25 percent. One or more other photoinitiating compounds, such as IRGACURE-184, DAROCUR 1173 and those listed below, may also be present. Preferably, the other photoinitiating compound is IRGACURE-184. More preferably, the IRGACURE-184 constitutes about 0.5 to about 6 percent of the weight of the base resin, most preferably about 3 percent. However, it should be understood that, in preferred embodiments of the invention photoinitiating compounds such as IRGACURE-184 and DAROCUR 1173 are unsuitable to serve as the lone photoinitiating compound insofar as they do not absorb an adequate amount of UV light in the wavelength region above about 325 nm, preferably above about 400 nm. These other photoinitiators can be used in combination with the preferred photoinitiators, but will not give the desired degree of cure in the matrix film (%RAU) on their own. Examples of additional photoinitiating compounds include but are not limited to hydroxycyclohexylphenyl ketone; hydroxymethylphenylpropanone; dimethoxyphenylacetophenone; 1-(4-isopropylphenyl)-2-hydroxy-2-methylpropan-1-one; 4-(2-hydroxyethoxy)phenyl-(2-hydroxy-2-propyl)ketone; 1-(4-dodecyl phenyl)-2-hydroxy-2-methylpropan-1-one; diethoxyacetophenone; 2,2-di-sec-butoxy-acetophenone; diethoxyphenyl acetophenone; and mixtures thereof.

Examples of suitable photoinitiators include at least one photoinitiating compound selected from the group consisting of bis-acyl phosphine oxide; hydroxycyclohexylphenyl ketone; hydroxymethylphenylpropanone; dimethoxyphenylacetophenone; 2-methyl-1,4-(methyl thio)phenyl-2-morpholino-propanone-1; 1-(4-isopropylphenyl)-2-hydroxy-2-methylpropan-1-one; 4-(2-hydroxyethyoxy) phenyl-(2-hydroxy-2-propyl)ketone; 1-(4-dodecyl phenyl)-2-hydroxy-2-methylpropan-1-one; diethoxyacetophenone; 2,2-di-sec-butoxy-acetophenone; diethoxyphenyl acetophenone; bis(2,6-dimethoxybenzoyl)-2,4,4-trimethylpentylphosphine oxide; 2,4,6-trimethylbenzoyldiphenylphosphine oxide; 2,4,6-trimethylbenzoylethoxyphenylphosphine oxide; and mixtures thereof.

A typical photoinitiator comprises bis-acyl phosphine oxide which constitutes about 0.25 to about 7 percent of the weight of the matrix.

Another typical photoinitiator comprises IRGACURE-819 which constitutes about 0.5 to about 6 percent, preferably about 2.25 percent, of the weight of the base resin, optionally further comprising IRGACURE-184 which constitutes about 0.5 to about 6 percent, preferably about 3 percent, of the weight of the base resin.

The following Table 3A lists properties of a number of photoinitiators.

TABLE 3A

| Photoinitiator | Absorption @ 325 nm | Absorption @ 400 nm | Supplier | Chemical Name |
| --- | --- | --- | --- | --- |
| Irgacure 784 | >3 | 2.25 | Ciba Specialty Chemicals | — |
| Irgacure 819 | >2 | 1.5 | Ciba Specialty Chemicals | Phenyl bis-(2,4,6-trimethylbenzoyl)phosphine oxide |
| Irgacure 1850 | >3 | 0.75 | Ciba Specialty Chemicals | Blend of 50% bis(2,6-dimethoxybenzoyl)-2,4,4-trimethylpentylphosphine oxide and 50% 1-hydroxycyclohexylphenyl ketone |
| Irgacure 1300 | >2 | 0.4 | Ciba Specialty Chemicals | Blend of 30% 2-benzyl-2-(N,N-dimethylamino)-1-(4-morpholinophenyl)-1-butanone and 70% dimethoxyphenylacetophenone. |
| Irgacure 1800 | >2 | 0.3 | Ciba Specialty Chemicals | Blend of 25% bis(2,6-dimethoxybenzoyl)-2,4,4-trimethylpentylphosphine oxide and 75% 1-hydroxycyclohexylphenyl ketone |
| Irgacure 1700 | >2 | 0.3 | Ciba Specialty Chemicals | Blend of 25% bis(2,6-dimethoxybenzoyl)-2,4,4-trimethylpentylphosphine oxide and 75% hydroxymethylphenylpropanone |
| Darocur 4265 | 1 | 0.3 | Ciba Specialty Chemicals | Blend of 50% 2,4,6-trimethylbenzoyldiphenylphosphine oxide and 50% hydroxymethylphenylpropanone |
| Irgacure 907 | >2 | 0.1 | Ciba Specialty Chemicals | 2-methyl-1,4-(methyl thio)-phenyl-2-morpholinopropanone |
| Irgacure 369 | >2 | 0.25 | Ciba Specialty Chemicals | 2-benzyl-2-(N,N-dimethylamino)-1-(4-morpholinophenyl)-1-butanone |

All data from Ciba Specialty Chemicals provided in literature titled "Photoinitiators for UV Curing - Key Products Selection Guide". Publication Date: 1999
All absorbance values are for the photoinitiator at a concentration of 0.1% by weight.
Additional photoinitiators with adequate absorption at both 325 and 400 nm
TPO by BASF
TPO-L (8893) by BASF III. Antioxidants or Acrylated Silicone Additives The matrix material also may comprise one or more antioxidants or silicone additives. Preferably, the silicone additives are acrylated silicone additives. The purposes of adding the silicone additives are for increasing surface slip and/or improving release of the matrix material from the colored fibers. Typical silicone acrylates include one or more of TegoRad 2100, 2250, 2500, and 2700; CoatOSil 3503 and 3509 from 'OSi Specialties Greenwich, Conn.; Byk 371, UV 3500 and 3530 from Byk Chemie USA Wallingford Conn.

The preferred antioxidant is Irganox 1035, which is available from Ciba Specialty Chemicals (Tarrytown, N.Y.). Preferably, it is present in amount that constitutes about 1 percent of the weight of the matrix material. The preferred silicone additive is TegoRad 2200, which is available from Tego Chemie Service (Essen, Germany). Preferably, it is present in amount that constitutes about 0.1 percent of the weight of the matrix material.

IV. The Opacifier Blend

The matrix material preferably comprises about 0 to about 10 percent by weight of an opacifier blend. An opacifier blend is less preferable when the color of the matrix material is black.

The blend may comprise opacifying compounds such as $TiO_2$, $BaSO_4$, ZnO or ZnS, preferably about 40 to about 50 percent by weight of the blend is $TiO_2$. A most preferred opacifier blend is described in Table 4.

TABLE 4

Preferred Opacifier (Opaque White Base)

| Product | % | Description | Supplier |
|---|---|---|---|
| Preservative | 3.00 | See Table 5 | See Table 5 |
| TITANIUM DIOXIDE 600-I | 45.00 | Opacifier/Pigment | Kemira, Inc. Savannah, GA |
| UVITEX OB | 0.10 | Optical Brightener (2,-2'-(2,5-Thiophene-diyl)bis(5-tertbutyl-benzoxazole) | Ciba Geigy Hawthorne, NY |
| PHOTOMER 4028 | 11.00 | Ethoxylated Bisphenol-A Diacrylate Monomer | Cognis Corp. Ambler, PA |
| TPGDA | 2.90 | Tripropylene Glycol Diacrylate | UCB Chemical Corp. Smyrna, GA |
| PHOTOMER 3082 | 37.00 | Acrylated Epoxy Linseed Oil Oligomer | Cognis Corp. Ambler, PA |
| FLORSTAB UV-5 STABILIZER | 1.00 | Stabilizer (Ester Plasticizer) | Kromachem USA, Inc. Irvington, NJ |
| Percent Total: | 100.00 | | |

The opacifier blend may contain a preservative and a stabilizer such as an ester plasticizer. A preferred preservative is described in Table 5.

TABLE 5

Preferred Preservative

| Product | % | Description | Supplier |
|---|---|---|---|
| PHOTOMER 3082 | 70.00 | Acrylated Epoxy Linseed Oil Oligomer | Cognis Corp. Ambler, PA |
| CAO-3 BHT | 20.00 | 2,6-Di-t-butyl-p-cresol (Antioxident) | PMC Specialties Group, Inc., Fords, NJ |
| TECQUINOL | 10.00 | Hydroquinone (Stabilizer) | Eastman Chemical Prod., Kingsport, TN |
| Percent Total: | 100.00 | | |

V. The Color Blend

The matrix material preferably comprises about 0.01 to about 10 percent by weight of at least one color blend, preferably a pigment blend, more preferably about 0.5 to about 5 percent of a pigment blend, most preferably about 0.6 to about 4 percent of a pigment blend, for example about 0.9 to about 4 percent of a pigment blend. The matrix colors are achieved with about 1 to about 5 different color pigment blends, depending on the desired final color. Most colors are obtained with one or two pigment blends.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines.

Specific examples of suitable red pigments include anthraquinone (red), napthole red, monoazo based pigments, quinacridone pigments, anthraquinone, and perylenes.

Specific examples of suitable green pigments include phthalocyanine green and nitroso based pigments.

Specific examples of suitable orange pigments include monoazo and diazo based pigments, quinacridone pigments, anthraquinones and perylenes.

Specific examples of suitable violet pigments include quinacrinode violet, basic dye pigments and carbazole dioxazine based pigments.

Suitable aqua, brown, gray, and pink pigments can easily be formulated by combining other colors.

The pigment blends preferably comprise:

(a) about 10 to about 25 percent by weight of one or more pigment compounds, more preferably about 13 to about 20 percent;

(b) about 0.5 to about 10 percent by weight of tripropylene glycol diacrylate, more preferably about 1 to about 5 percent;

(c) about 20 to about 40 percent by weight of acrylated epoxy linseed oil, more preferably about 25 to about 35 percent;

(d) about 0.5 to about 3 percent by weight of epoxy acrylate/triacrylate oligomer blend stabilizer, more preferably about 1 to about 2 percent; and (e) optionally about 35 to about 65 percent by weight of a clear secondary coating (described below), more preferably about 45 to about 55 percent;

wherein these percentages by weight are based on the total weight of (a), (b), (c), (d) and (e).

More preferably, the pigment blend accounts for about 0.9 to about 4 percent by weight of the matrix material, and comprises:

(a) one or more pigment compounds that constitute about 13 to about 20 percent of the weight of the pigment blend;

(b) tripropylene glycol diacrylate that constitutes about 1 to about 5 percent of the weight of the pigment blend;

(c) acrylated epoxy linseed oil that constitutes about 25 to about 35 percent of the weight of the pigment blend;

(d) a stabilizer blend, comprising epoxy acrylate and triacrylate oligomers, that constitutes about 1 to about 2 percent of the weight of the pigment blend; and (e) a secondary coating that constitutes about 45 to about 55 percent of the weight of the pigment blend.

Preferably, the secondary coating comprises:

(a) a urethane acrylate oligomer and at least one other acrylate oligomer that together constitute about 85 to about 98 percent of the weight of the secondary coating;

(b) a photoinitiator that constitutes about 2 to about 6 percent of the weight of the secondary coating; and (c) optionally, an antioxidant that constitutes about 0.5 to about 1.5 percent of the weight of the secondary coating.

More preferably, the secondary coating comprises:
(a) a urethane acrylate oligomer and hexanediol diacrylate monomer that together constitute about 87 to about 96 percent of the weight of the secondary coating;
(b) 1-hydroxycyclohexyl phenyl ketone in an amount that constitutes about 3 to about 5 percent of the weight of the secondary coating; and
(c) thiodiethylene(3,5-di-t-butyl-4-hydroxy) hydrocinnamate in an amount that constitutes about 0.7 to about 1.3 percent of the weight of the secondary coating.

A preferred secondary coating is described in Table 6.

TABLE 6

Preferred Secondary Optical Coating

| Product | % | Description | Supplier |
|---|---|---|---|
| MCWHORTER 15-1516 | 88.00 | Urethane Acrylate Oligomer -- Hexanediol Diacrylate Blend | McWhorter Technologies, Carpentersville, IL |
| HDODA | 7.00 | Hexanediol Diacrylate | UCB Chemical Corp. Smyrna, GA |
| IRGACURE 184 | 4.00 | 1-Hydroxycyclohexyl Phenyl Ketone (Photoinitiator) | Ciba Geigy Tarrytown, NY |
| IRGANOX 1035 | 1.00 | Thiodiethylene (3,5-dit butyl-4-hydroxy)-hydrocinnamate (Antioxidant) | Ciba Geigy Tarrytown, NY |
| Percent Total: | 100.00 | | |

This secondary coating is not required. Any ultraviolet-curable clear coating can be used as it is substantially free of chromophores. Preferably, it is compatible with the pigment dispersion and does not cause accelerated settling of the pigment.

Preferred pigments, for various colors, are described in Tables 7–16 below.

TABLE 7

Preferred Blue Pigment Letdown (No. 1)

| Product | % | Description | Supplier |
|---|---|---|---|
| SUNFAST BLUE GS | 18.50 | Phthalocyanine Blue Pigment (green shade) | Sun Chem. Cincinnati, OH |
| TPGDA | 2.50 | Tripropylene Glycol Diacrylate | UCB Chemical Corp. Smyrna, GA |
| PHOTOMER 3082 | 27.75 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem USA, Inc. Irvington, NJ |
| Secondary Coating | 50.00 | See Table 6 | |
| Percent Total: | 100.00 | | |

TABLE 8

Preferred Blue Pigment Letdown (No. 2)

| Product | % | Description | Supplier |
|---|---|---|---|
| CHROMOFINE BLUE HS-4 | 18.50 | Phthalocyanine Blue Pigment (red shade) | Diacolor-Pope Clifton, NJ |
| TPGDA | 2.25 | Tripropylene Glycol Diacrylate | UCB Chemical Corp. Smyrna, GA |

TABLE 8-continued

Preferred Blue Pigment Letdown (No. 2)

| Product | % | Description | Supplier |
|---|---|---|---|
| PHOTOMER 3082 | 28.00 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem USA, Inc. Irvington, NJ |
| Secondary Coating | 50.00 | See Table 6 | |
| Percent Total: | 100.00 | | |

TABLE 9

Preferred Orange Pigmented Letdown

| Product | % | Description | Supplier |
|---|---|---|---|
| GRAPHTOL ORANGE GPS | 17.50 | C.I. Pigment Orange 13 (Disazopyrazolone) | Clariant Corp. Charlotte, NC |
| TPGDA | 5.25 | Tripropylene Glycol Diacrylate | UCB Chemical Corp. Smyrna, GA |
| PHOTOMER 3082 | 26.00 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem USA, Inc. Irvington, NJ |
| Secondary Coating | 50.00 | See Table 6 | |
| Percent Total: | 100.00 | | |

TABLE 10

Preferred Yellow Pigmented Letdown

| Product | % | Description | Supplier |
|---|---|---|---|
| SANDORIN YELLOW 4G | 17.50 | C.I. Pigment Yellow 155 (Disazo) - Green Shade | Clariant Corp. Charlotte, NC |
| TPGDA | 5.25 | Tripropylene Glycol Diacrylate | UCB Chemical Corp. Smyrna, GA |
| PHOTOMER 3082 | 26.00 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem USA, Inc. Irvington, NJ |
| Secondary Coating | 50.00 | See Table 6 | |
| Percent Total: | 100.00 | | |

TABLE 11

Preferred Red Pigmented Letdown (No. 1)

| Product | % | Description | Supplier |
|---|---|---|---|
| GRAPHTOL FAST RED 2GLD | 16.50 | 4-[2,5-Dichloro-4-Hydroxy-N-(2-Methyl-phenyl)]-2-Naphthalene-carboxamide | Clariant Corp. Charlotte, NC |
| TPGDA | 4.75 | Tripropylene Glycol Diacrylate | UCB Chemical Corp. Smyrna, GA |
| PHOTOMER 3082 | 27.50 | Acrylated Epoxy Linseed Oil Oligomer | Cognis Corp. Ambler, PA |

TABLE 11-continued

Preferred Red Pigmented Letdown (No. 1)

| Product | % | Description | Supplier |
|---|---|---|---|
| FLORSTAB UV-1 | 1.25 | Epoxy Acrylate/Triacrylate Oligomer Blend (Stabilizer) | Kromachem USA Inc. Irvington, NJ |
| Secondary Coating | 50.00 | See Table 6 | |
| Percent Total: | 100.00 | | |

TABLE 12

Preferred Red Pigmented Letdown (No. 2)

| Product | % | Description | Supplier |
|---|---|---|---|
| GRAPHTOL RED NFB | 16.50 | C.I. Pigment Red 210 | Clariant Corp. Charlotte, NC |
| TPGDA | 4.75 | Tripropylene Glycol Diacrylate | UCB Chemical Corp. Smyrna, GA |
| PHOTOMER 3082 | 27.50 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem USA, Inc. Irvington, NJ |
| Secondary Coating | 50.00 | See Table 6 | |
| Percent Total: | 100.00 | | |

TABLE 13

Preferred Red Pigmented Letdown (No. 3)

| Product | % | Description | Supplier |
|---|---|---|---|
| SANDORIN RED BN | 16.50 | N,N'-(2,5-dichloro-1,4-phenylene)bis[4-[2,5-dichlorophenyl)azo]-3-hydroxy-2-Naphthalene-carboxamide | Clariant Corp. Charlotte, NC |
| TPGDA | 4.75 | Tripropylene Glycol Diacrylate | UCB Chemical Corp. Smyrna, GA |
| PHOTOMER 3082 | 27.50 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem USA, Inc. Irvington, NJ |
| Secondary Coating | 50.00 | See Table 6 | |
| Percent Total: | 100.00 | | |

TABLE 14

Preferred Black Pigmented Letdown

| Product | % | Description | Supplier |
|---|---|---|---|
| SPECIAL BLACK 350 | 18.50 | Carbon Black | Degussa Ridgefield Park, NJ |
| TPGDA | 1.25 | Tripropylene Glycol Diacrylate | UCB Chemical Corp. Smyrna, GA |
| PHOTOMER 3082 | 28.50 | Acrylated Epoxy Linseed Oil Oligomer | Cognis Corp. Ambler, PA |

TABLE 14-continued

Preferred Black Pigmented Letdown

| Product | % | Description | Supplier |
|---|---|---|---|
| FLORSTAB UV-1 | 1.75 | Epoxy Acrylate/Triacrylate Oligomer Blend (Stabilizer) | Kromachem USA, Inc. Irvington, NJ |
| Secondary Coating | 50.00 | See Table 6 | |
| Percent Total: | 100.00 | | |

TABLE 15

Preferred Violet Pigmented Letdown

| Product | % | Description | Supplier |
|---|---|---|---|
| CARBAZOLE VIOLET 246-0487 | 14.00 | C.I. Pigment Violet 23 | Sun Chemical Cincinnati, OH |
| TPGDA | 1.75 | Tripropylene Glycol Diacrylate | UCB Chemical Corp. Smyrna, GA |
| PHOTOMER 3082 | 33.00 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem, USA, Inc. Irvington, NJ |
| Secondary Coating | 50.00 | See Table 6 | |
| Percent Total: | 100.00 | | |

TABLE 16

Preferred Green Pigmented Letdown

| Product | % | Description | Supplier |
|---|---|---|---|
| PHTHALO GREEN BS | 18.50 | Phthalocyanine Green Pigment (Blue Shade) - C.I. Pigment Green 7 | Sun Chemical Cincinnati, OH |
| TPGDA | 2.00 | Tripropylene Glycol Diacrylate | UCB Chemical Corp. Smyrna, GA |
| PHOTOMER 3082 | 28.25 | Acrylated Epoxy Linseed Oil Oligomer | Cognis Corp. Ambler, PA |
| FLORSTAB UV-1 | 1.25 | Epoxy Acrylate/Triacrylate Oligomer Blend (Stabilizer) | Kromachem USA, Inc. Irvington, NJ |
| Secondary Coating | 50.00 | See Table 6 | |
| Percent total: | 100.00 | | |

While the color blends have been disclosed in this application by reference to the details of preferred pigments, any colored inorganic or organic material (be it pigment, dye, ink or other substance) will suffice so long as it can, in combination with a material of sufficient opacity, enable a fiber optic matrix, ribbon or coating material to exhibit the properties listed in Tables 1 and 2.

VI. Stabilizers

The matrix material may include from about 0.1 percent to about 2 percent by weight of a stabilizer or antioxidant. A desirable property of such compounds includes non-migration (probably enhanced by low polarity). Such compounds include tertiary amines; hindered amines; organic phosphites; hindered phenols; hydrocinnamates; propionates; and mixtures thereof. Preferably such compounds include hindered phenols; hydrocinnamates; propionates; and mixtures thereof. More specific examples include diethylethanolamine; trihexylamine; octadecyl-3-(3',5'-di-tert-butyl-4'-hydroxyphenyl)propionate; thiodiethylene bis(3,5-di-tert-butyl-4-hydroxy)hydrocinnamate; and tetrakis [methylene(3,5-di-tert-butyl-4-hydroxyhydrocinnamate)] methane. A preferred compound is thiodiethylene bis(3,5-di-tert-butyl-4'-hydroxy)hydrocinnamate, such as IRGANOX 1035, from Ciba-Geigy Corporation, Ardsley, N.Y.

The Optical Fiber Ribbon Assembly

The invention further relates to an optical fiber ribbon assembly. The ribbon assembly generally comprises a plurality of coated, inked optical fibers held in a fixed relationship (e.g., in a parallel and planar or other prescribed arrangement), and the radiation-curable matrix material described above, in which the fibers are embedded. The matrix material remains adhered to the fibers during use but is easily strippable therefrom without substantially damaging the integrity of an ink layer or otherwise colored layer on the coated optical fibers. One kind of ribbon structure, and a cable made from such ribbon, is described in U.S. Pat. No. 3,411,010 to Gendhr et al., which is incorporated herein by reference.

The optical fibers which are part of the ribbon are those known in the art which are singly or dually coated before being bonded in the matrix material, and which contain an ink layer or otherwise colored layer on their outermost surface, rendering each distinguishable from other fibers in the ribbon. This outermost layer may be achieved either by adding a colored material to the secondary coating on the fiber or by applying an ink layer on top of a primary and secondary coated fiber. The optical fibers which are coated may comprise, for example, a glass core and a glass cladding layer. The core, for example, may comprise silica doped with oxides of germanium or phosphorus, and the cladding may comprise a pure or doped silicate such as a fluorosilicate. Alternatively, the fibers may comprise a polymer clad silica glass core. Examples of such polymer cladding include organosiloxanes such as polydimethylsiloxane and fluorinated acrylic polymer.

The fiber coatings are of the type known in the art and preferably are cured with ultraviolet light. The coating compositions may comprise a single or a dual layer and often contain cured acrylate or methacrylate components such as urethane diacrylates. A suitable second fiber coating may comprise an aromatic polyester urethane acrylate; vinyl pyrrolidone; ethoxyethoxyethylacrylate; photoinitiator; and stabilizer.

As discussed earlier, in order for the optical fiber ribbons to be spliced in a reasonably easy manner, it is desirable to identify the individual fibers by color coding them.

It is possible to add a coloring agent to the outermost fiber coating layer; however, it is more efficacious to ink over the optical fiber coatings' ink-containing layers by any means known in the art. The applied ink composition may be variable in nature but generally is comprised of radiation-curable oligomers and monomers with acrylate, methacrylate, vinyl, or vinyl ether functional groups and contains a dispersion of one or more organic and/or inorganic pigment compounds of the general types described above in sections IV and V of the Description of Preferred Embodiments. Alternatively, the applied ink composition is vinylic and may comprise, for example, one or more organic or inorganic pigments; a vinyl copolymer; synthetic silica; and an organic solvent. The precise nature of the ink composition may dictate the amounts and nature of the adhesion-affecting components in the matrix.

Process for Preparing an Optical Fiber Ribbon

The invention comprises, in a further aspect, a process for preparing an optical fiber ribbon. Broadly, the process comprises mechanically arranging coated and inked fibers in a desired (i.e., generally planar and generally parallel) configuration; applying the aforesaid matrix material about the fibers; and curing.

A suitable but non-limiting method for applying the matrix material to the fibers is as follows. Optical fibers which have been coated and colored or otherwise inked in the manner described above or in any manner known in the art may be used. The optical fibers may be mechanically arranged in the desired configuration (e.g., in a generally parallel and planar disposition relative to each other). The fibers may be held in the desired configuration, for example, by taping or otherwise holding the ends together. The matrix material may be applied about the fibers by any conventional means, with the most common application method being to process the colored fibers through a cup of the matrix material and subsequently pass the coated structure through a die to give uniform dimension to the ribbon prior to curing via radiation. Other means of application such as dipping the fibers into a vat of the material or pouring the material thereupon may be employed, but these are not preferred since the ribbon geometry is not well controlled using these methods. Once the matrix has been applied substantially uniformly about the fibers, it may be radiation cured, preferably by ultraviolet light.

Alternatively, matrix material may be applied and cured and then the composite may be flipped over, more matrix material applied thereto, and the matrix again cured as above. The resulting ribbon contains the fibers bonded and secured in the desired disposition.

The adhesive bond of the cured matrix material to the coated and inked fibers may be adjusted by incorporation into the uncured matrix material of a component capable of increasing the adhesive bonds.

Radiation-Curable Composition

The invention further comprises a composition used for forming a radiation-curable ribbon matrix in which at least two coated and colored optical fibers are embedded. The composition includes the ingredients and components of the matrix material described above. After curing, the composition also exhibits substantially the same characteristics, such as hue angle, contrast ratio, inside degree of cure, lightness ranges and chroma values.

Coatings for Other Substrates

Although the matrix material has been exemplified above as a matrix material for coated and inked optical fibers, it is useful in any embodiment in which a substrate, especially a flexible and ink-covered substrate, needs to be coated or bound and wherein the coating must adhere well to the substrate.

Examples of such substrates include, but are not limited to, glass, metal and plastic. For example, the matrix material may be used as a release coating for a glass or plastic substrate having a logo printed thereon, as used in electronics and other industries, to identify a supplier. Indeed, it may be useful in any embodiment where it is desirable to temporarily protect a printed surface. For example, a logo may be protected during shipping with a release coating of the matrix, which may be removed by the customer.

In Tables 17 and 18 the photoiniator composition includes 3.0 percent of IRGACURE 184 photoiniator, 2.25 percent of IRGACURE 819 photoinitiator, 1.0 percent IRGANOX 1035 antioxidant, 0.1 percent TegoRad 2200 silicone acrylate, and the remainder is isobornyl acrylate.

TABLE 17

Full Matrix Formulations

| Components | Blue Matrix | Orange Matrix | Green Matrix | Brown Matrix | Slate Matrix | White Matrix |
|---|---|---|---|---|---|---|
| Base Resin | 88.515% | 87.89% | 89.606% | 88.922% | 89.05% | 87.57% |
| Photoinitiator | 9.13 | 9.06 | 9.242 | 9.172 | 9.18 | 9.03 |
| Opacifier | 1.350 | 0.550 | 0.160 | 0.450 | 1.500 | 3.400 |
| Antioxidant | | | | | | |
| Blue No. 1 Pig. | 0.810 | | 0.288 | | 0.040 | |
| Blue No. 2 Pig. | 0.195 | | | | | |
| Orange Pig. | | 2.500 | | 0.600 | | |
| Yellow Pig. | | | 0.704 | 0.350 | | |
| Red No. 2 Pig. | | | | | | |
| Red No. 1 Pig. | | | | 0.250 | | |
| Black Pig. | | | | 0.256 | 0.230 | |
| Percent Total: | 100.000 | 100.000 | 100.000 | 100.000 | 100.000 | 100.000 |

TABLE 18

Full Matrix Formulations

| Components | Red Matrix | Black Matrix | Yellow Matrix | Violet Matrix | Rose Matrix | Aqua Matrix |
|---|---|---|---|---|---|---|
| Base Resin | 87.48% | 90.034% | 87.79% | 89.743% | 88.47% | 88.52% |
| Photoinitiator | 9.02 | 9.286 | 9.06 | 9.256 | 9.13 | 9.13 |
| Opacifier | 0.500 | | 0.900 | 0.634 | 1.600 | 1.800 |
| Red No. 1 Pig. | 3.000 | | | | | |
| Black Pig. | | 0.600 | | | | |
| Violet Pig. | | 0.080 | | 0.300 | | |
| Yellow Pig. | | | 2.250 | | | |
| Red No. 2 Pig. | | | | 0.067 | | |
| Red No. 3 Pig. | | | | | 0.800 | |
| Blue No. 1 Pig. | | | | | | 0.150 |
| Green Pig. | | | | | | 0.400 |
| Percent Total: | 100.000 | 100.000 | 100.000 | 100.000 | 100.000 | 100.000 |

EXAMPLES

The following exemplary matrix material formulations in the Tables 17 and 18 below serve to further illustrate the invention. Each formulation exhibits characteristics that fall within the ranges for the respective colors defined in Tables 1 and 2.

All parts and percentages are by weight of the total matrix composition described in that example, including all components. Each formulation comprises the following components: the base resin blend of Table 3, a photoinitiator, the opacifier blend of Table 4, the preservative blend of Table 5 and one or more pigment blends. Each individual pigment blend comprises the secondary coating of Table 6 and one of the pigmented letdown blends of Tables 7–16. While some of the individual components contain preservatives, stabilizers and other such additives, no such optional ingredients were added directly to the compositions as components in themselves. Such optional components, however, may be necessary for use if the exemplified matrix materials are to meet the rigorous requirements for commercially acceptable matrices for optical glass fiber ribbons.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art within the spirit of the invention and the scope of the appended claims.

I claim:

1. An optical fiber ribbon comprising:

a plurality of optical fibers embedded within a matrix, wherein the matrix is formed from a reactive mixture comprising:
   (a) about 80 to about 99.7 percent by weight of a base resin comprising one or more acrylated, methacrylated or vinyl functional oligomers and/or monomers;
   (b) about 0.1 to about 10 percent by weight of a photoinitiator that absorbs light in the wavelength region above about 400 nm
   (c) about 0.1 to about 10 percent by weight of an opacifier blend, unless the matrix, when cured, is black, in which case about 0 to about 10 percent by weight of an opacifier blend; and (d) about 0.01 to about 10 percent by weight of at least one color blend;
  wherein the foregoing percentages by weight are based on the total weight of (a), (b), (c) and (d);
  wherein, after curing, the matrix has a color selected from the group consisting of blue, orange, green, brown, slate, white, red, black, yellow, violet, rose and aqua;
  wherein, when a first 100 micron thick sample of the matrix, which is 80 mm wide and 120 mm long, is cured on a glass plate 6 mm thick with a radiation dose of about 0.2 J/cm², the first 100 micron sample exhibits an inside degree of cure as an inside percent reacted acrylate unsaturation of more than about 70 percent as measured via FTIR-ATR;
  wherein, when placed under a clear 150 micron thick UV-curable coating which is substantially free of chromophores, a 25 micron thick by 75 mm wide by 180 mm long sample of the cured matrix exhibits, as determined by a means for spectrophotometrically analyzing, a hue angle range having the following values for each respectively colored matrix: blue is about 230 to about 270; orange is about 55 to about 80; green is about 120 to about 185; brown is about 35 to about 80; slate is about 0 to about 360; white is about 0 to about 360; red is about 325 to about 50; black is about 0 to about 360; yellow is about 80 to about 120; violet is about 270 to about 325; rose is about 0 to about 22; and aqua is about 184 to about 230; and
  wherein a second 100 micron thick by 80 mm wide by 120 mm long sample of the cured matrix exhibits a minimum contrast ratio, as measured via the measurement procedure portion of ASTM D2805-88, having the following values for each respectively colored matrix: blue is about 42; orange is about 30; green is about 8; brown is about 22; slate is about 24; white is about 36; red is about 30; black is about 3; yellow is about 27; violet is about 16; rose is about 37; and aqua is about 35.

2. The optical fiber ribbon of claim 1, wherein the optical fibers are colored; wherein the color blend is a pigment blend; and wherein the photoinitiator absorbs light in the wavelength region above about 400 nm.

3. The optical fiber ribbon of claim 2, wherein the 25 micron sample of the cured matrix exhibits, when placed under the 150 micron thick UV-curable coating, a lightness range, as determined by the means for spectrophotometrically analyzing, having the following values for each respectively colored matrix: blue is about 55 to about 80; orange is about 57 to about 82; green is about 70 to about 95; brown is about 54 to about 79; slate is about 61 to about 86; white is about 78 to about 98; red is about 46 to about 71; black is about 60 to about 85; yellow is about 73 to about 98; violet is about 60 to about 85; rose is about 59 to about 84; and aqua is about 67 to about 92.

4. The optical fiber ribbon of claim 3, wherein the 25 micron sample of the cured matrix exhibits, when placed under the 150 micron thick UV-curable coating, the following chroma values, as determined by the means for spectrophotometrically analyzing, for each respectively colored matrix: blue is greater than about 18; orange is greater than about 48; green is greater than about 12; brown is greater than about 18; slate is about 0 to about 10; white is about 0 to about 12; red is greater than about 31; black is about 0 to about 10; yellow is greater than about 39; violet is greater than about 8; rose is greater than about 18; and aqua is greater than about 15.

5. The optical fiber ribbon of claim 4, wherein the first 100 micron sample exhibits a percent reacted acrylate unsaturation of more than about 80 percent.

6. The optical fiber ribbon of claim 5, wherein the 25 micron sample of the cured matrix exhibits a hue angle range having the following values for each respectively colored matrix: blue is about 230 to about 260; orange is about 55 to about 75; green is about 120 to about 150; brown is about 50 to about 80; slate is about 30 to about 220; white is about 85 to about 153; red is about 0 to about 50; black is about 3 to about 113; yellow is about 90 to about 115; violet is about 290 to about 325; rose is about 5 to about 22; and aqua is about 184 to about 210.

7. The optical fiber ribbon of claim 6, wherein the second 100 micron sample exhibits a minimum contrast ratio having the following values for each respectively colored matrix: blue is about 64; orange is about 46; green is about 12; brown is about 33; slate is about 36; white is about 55; red is about 46; black is about 5; yellow is about 41; violet is about 25; rose is about 56; and aqua is about 53.

8. The optical fiber ribbon of claim 7, wherein the 25 micron sample exhibits a lightness range having the following values for each respectively colored matrix: blue is about 60 to about 80; orange is about 60 to about 80; green is about 75 to about 95; brown is about 59 to about 79; slate is about 66 to about 86; white is about 83 to about 98; red is about 51 to about 71; black is about 60 to about 80; yellow is about 80 to about 95; violet is about 65 to about 85; rose is about 62 to about 82; and aqua is about 72 to about 87.

9. The optical fiber ribbon of claim 8, wherein the 25 micron sample exhibits the following chroma values for each respectively colored matrix: blue is greater than about 28; orange is greater than about 72; green is greater than about 13.5; brown is greater than about 25; slate is about 0 to about 7; white is about 0 to about 11; red is greater than about 48; black is about 0 to about 5; yellow is greater than about 51; violet is greater than about 11; rose is greater than about 21; and aqua is greater than about 19.

10. The optical fiber ribbon of claim 9, wherein the inside percent reacted acrylate unsaturation of the first 100 micron sample is more than about 85 percent.

11. The optical fiber ribbon of claim 10, wherein the 25 micron sample of the cured matrix exhibits a hue angle range having the following values for each respectively colored matrix: blue is about 233 to about 250; orange is about 61 to about 69; green is about 120 to about 143; brown is about 58 to about 78; slate is about 69 to about 190; white is about 100 to about 138; red is about 19 to about 31; black is about 18 to about 98; yellow is about 99 to about 112; violet is about 292 to about 324; rose is about 7 to about 22; and aqua is about 184 to 202.

12. The optical fiber ribbon of claim 11, wherein the second 100 micron sample exhibits a minimum contrast ratio having the following values for each respectively colored matrix: blue is about 71; orange is about 51; green is about 14; brown is about 37; slate is about 40; white is about 61; red is about 51; black is about 6; yellow is about 46; violet is about 28; rose is about 63; and aqua is about 59; and
  wherein the 25 micron sample exhibits a lightness range having the following values for each respectively colored matrix: blue is about 63 to about 75; orange is about 66 to about 77; green is about 79 to about 90; brown is about 62 to about 74; slate is about 70 to about 81; white is about 91 to about 98; red is about 55 to about 66; black is about 67 to about 80; yellow is about 85 to about 93; violet is about 71 to about 82; rose is about 64 to about 79; and aqua is about 76 to about 87.

13. The optical fiber ribbon of claim 2, wherein the opacifier blend constitutes about 0.5 to about 3.5 percent of the weight of the matrix, wherein the opacifier blend comprises an opacifying compound that constitutes about 40 to about 50 percent of the weight of the opacifier blend, and wherein the opacifying compound is selected from the group consisting of $TiO_2$, $BaSO_4$, ZnO, and ZnS.

14. The optical fiber ribbon of claim 13, wherein the opacifying compound is $TiO_2$.

15. The optical fiber ribbon of claim 14, wherein the photoinitiator comprises at least one photoinitiating compound selected from the group consisting of bis-acyl phosphine oxide; hydroxycyclohexylphenyl ketone; hydroxymethylphenylpropanone; dimethoxyphenylacetophenone; 2-methyl-1,4-(methyl thio)phenyl-2-morpholinopropanone-1; 1-(4-isopropylphenyl)-2-hydroxy-2-methylpropan-1-one; 4-(2-hydroxyethyoxy)phenyl-(2-hydroxy-2-propyl)ketone; 1-(4-dodecyl phenyl)-2-hydroxy-2-methylpropan-1-one; diethoxyacetophenone; 2,2-di-sec-butoxy-acetophenone; diethoxyphenyl acetophenone; bis(2, 6-dimethoxybenzoyl)-2,4,4-trimethylpentylphosphine oxide; 2,4,6-trimethylbenzoyldiphenylphosphine oxide; 2,4, 6-trimethylbenzoylethoxyphenylphosphine oxide; and mixtures thereof.

16. The optical fiber ribbon of claim 14, wherein the photoinitiator comprises bis-acyl phosphine oxide which constitutes about 0.25 to about 7 percent of the weight of the matrix.

17. The optical fiber ribbon of claim 16, wherein the photoinitiator comprises phenyl bis(2,4,6-trimethylbenzoyl)-phosphine oxide which constitutes about 0.5 to about 6 percent of the weight of the base resin.

18. The optical fiber ribbon of claim 17, wherein the photoinitiator further comprises 1-hydroxycyclohexyl phenyl ketone which constitutes about 0.5 to about 6 percent of the weight of the base resin.

19. The optical fiber ribbon of claim 18, wherein the photoinitiator comprises bis(2,4,6-trimethylbenzoyl)-phosphine oxide in an amount that constitutes about 2.25 percent of the weight of the base resin, and 1-hydroxycyclohexyl phenyl ketone in an amount that constitutes about 3 percent of the weight of the base resin.

20. The optical fiber ribbon of claim 2, wherein the pigment blend constitutes about 0.9 to about 4 percent of the weight of the matrix, and wherein the pigment blend comprises:
  (a) one or more pigment compounds that constitute about 13 to about 20 percent of the weight of the pigment blend;
  (b) tripropylene glycol diacrylate that constitutes about 1 to about 5 percent of the weight of the pigment blend;
  (c) acrylated epoxy linseed oil that constitutes about 25 to about 35 percent of the weight of the pigment blend;
  (d) a stabilizer blend, comprising epoxy acrylate and triacrylate oligomers, that constitutes about 1 to about 2 percent of the weight of the pigment blend; and
  (e) an optional secondary clear coating that constitutes about 45 to about 55 percent of the weight of the pigment blend.

21. The optical fiber ribbon of claim 20, wherein the secondary coating comprises:
  (a) urethane acrylate oligomer and at least one other acrylate oligomer that together constitute about 85 to about 98 percent of the weight of the secondary coating;
  (b) a photoinitiator that constitutes about 2 to about 6 percent of the weight of the secondary coating; and
  (c) optionally, an antioxidant that constitutes about 0.5 to about 1.5 percent of the weight of the secondary coating.

22. The optical fiber ribbon of claim 20, wherein the secondary coating comprises:
  (a) a urethane acrylate oligomer and hexanediol diacrylate monomer that together constitute about 87 to about 96 percent of the weight of the secondary coating;
  (b) 1-hydroxycyclohexyl phenyl ketone in an amount that constitutes about 3 to about 5 percent of the weight of the secondary coating; and
  (c) thiodiethylene(3,5-di-t-butyl-4-hydroxy) hydrocinnamate in an amount that constitutes about 0.7 to about 1.3 percent of the weight of the secondary coating.

23. The optical fiber ribbon of claim 2, wherein the base resin comprises:
  (a) about 30 percent to about 80 percent by weight of one or more acrylated, methacrylated or vinyl functional oligomers with a chemical backbone based on an aliphatic urethane oligomer or epoxy oligomer, or a combination thereof;
  (b) from about 5 percent to about 45 percent by weight of one or more reactive diluent monomers having about 1 to about 5 functional groups;
  wherein all of the percentages by weight are based on the total weight of (a) and (b).

24. The optical fiber ribbon of claim 2, wherein the base resin comprises:
  (a) about 48 to about 52 percent by weight of one or more acrylated, methacrylated or vinyl functional oligomers with a chemical backbone based on an aliphatic urethane oligomer;
  (b) about 35 to about 45 percent by weight of one or more reactive diluent monomers having about 1 to about 5 functional groups selected from the group consisting of acrylate, methacrylate, vinyl ether, vinyl and combinations thereof, and
  wherein all of the percentages by weight are based on the total weight of (a) and (b).

25. The optical fiber ribbon of claim 24, wherein the aliphatic urethane oligomer backbone is the reaction product of an aliphatic polyether polyol and an aliphatic polyisocyanate.

26. The optical fiber ribbon of claim 25, wherein the functional group of the monomer comprises an acrylate.

27. The optical fiber ribbon of claim 26, wherein the monomer comprises an isocyanurate acrylate and isobornyl acrylate.

28. The optical fiber ribbon of claim 27, wherein the isocyanurate acrylate comprises tris-hydroxyethyl isocyanurate triacrylate.

29. The optical fiber ribbon of claim 25, wherein the reactive diluent comprises a monomer selected from the group consisting of $C_6$–$C_{12}$ hydrocarbon diol diacrylates; $C_6$–$C_{12}$ hydrocarbon diol dimethacrylates; tripropylene glycol diacrylate; tripropylene glycol dimethacrylate; neopentyl glycol diacrylate; neopentyl glycol dimethacrylate; neopentyl glycol propoxylate diacrylate; neopentyl glycol propoxylate dimethacrylate; neopentyl glycol ethoxylate diacrylate; neopentyl glycol ethoxylate dimethacrylate; bisphenol A ethoxylate diacrylate; bisphenol A ethoxylate dimethacrylate; bisphenol A propoxylate diacrylate; bisphenol A propoxylate dimethacrylate; phenoxyethyl acrylate; phenoxyethyl methacrylate; phenoxyethyl ethoxylate acrylate; phenoxyethyl ethoxylate methacrylate; phenoxyethyl propoxylate acrylate; phenoxyethyl propoxylate methacrylate; polyethylene glycol nonylphenylether acrylate; polyethylene glycol nonylphenylether methacrylate; polypropylene glycol nonylphenylether acrylate; polypropylene glycol nonylphenylether methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; tetrahydrofurfuryl acrylate; tetrahydrofurfuryl methacrylate; isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; dicyclopentenyl propoxylate acrylate; dicyclopentenyl propoxylate methacrylate; N-vinyl amides and mixtures thereof.

30. The optical fiber ribbon of claim 25, wherein the oligomer comprises an acrylated oligomer.

31. The optical fiber ribbon of claim 2, wherein the matrix comprises about 0.1 percent to about 2 percent by weight of the matrix of an oxidation stabilizer selected from the group consisting of tertiary amines, hindered amines, organic phosphites, hindered phenols, hydrocinnamates, propionates, and mixtures thereof.

32. The optical fiber ribbon of claim 2, wherein the base resin constitutes about 87 to about 95 percent of the weight of the matrix.

33. The process of claim 1, wherein said photoinitiator has an absorption value of greater than about 0.1 at 400 nm when measured at 0.1% concentration by weight in a non-absorbing solvent and path length of 1.0 centimeters.

34. The optical fiber ribbon of claim 1, wherein the cured matrix is blue.

35. The optical fiber ribbon of claim 1, wherein the cured matrix is orange.

36. The optical fiber ribbon of claim 1, wherein the cured matrix is green.

37. The optical fiber ribbon of claim 1, wherein the cured matrix is brown.

38. The optical fiber ribbon of claim 1, wherein the cured matrix is slate.

39. The optical fiber ribbon of claim 1, wherein the cured matrix is white.

40. The optical fiber ribbon of claim 1, wherein the cured matrix is red.

41. The optical fiber ribbon of claim 1, wherein the cured matrix is black.

42. The optical fiber ribbon of claim 1, wherein the cured matrix is yellow.

43. The optical fiber ribbon of claim 1, wherein the cured matrix is violet.

44. The optical fiber ribbon of claim 1, wherein the cured matrix is rose.

45. The optical fiber ribbon of claim 1, wherein the cured matrix is aqua.

46. A radiation-curable matrix material for affixing coated and optical fibers in a ribbon configuration in which are embedded at least two optical fibers, comprising:
(a) about 87 to about 95 percent by weight of a base resin comprising one or more acrylated, methacrylated or vinyl functional oligomers and/or monomers;
(b) about 0.1 to about 10 percent by weight of a photoinitiator that absorbs light in the wavelength region above about 400 nm;
(c) about 0.1 to about 10 percent by weight of an opacifier blend, unless the matrix material, when cured, is black, in which case about 0 to about 10 percent by weight of an opacifier blend; and
(d) about 0.01 to about 10 percent by weight of at least one color blend;
wherein the foregoing percentages by weight are based on the total weight of (a), (b), (c) and (d);
wherein, after curing, the matrix material has a color selected from the group consisting of blue, orange, green, brown, slate, white, red, black, yellow, violet, rose and aqua;
wherein, when a first 100 micron thick by 80 mm wide by 120 mm long sample of the matrix is cured on a glass plate 6 mm thick with a radiation dose of about 0.2 $J/cm^2$, the first 100 micron sample exhibits a percent reacted acrylate unsaturation of more than about 70 percent as measured via FTIR-ATR;
wherein, when placed under a clear 150 micron thick UV-curable coating which is substantially free of chromophores, a 25 micron thick by 75 mm wide by 180 mm long sample of the cured matrix exhibits, as determined by a means for spectrophotometrically analyzing, a hue angle range having the following values for each respectively colored matrix material: blue is about 230 to about 270; orange is about 55 to about 80; green is about 120 to about 185; brown is about 35 to about 80; slate is about 0 to about 360; white is about 0 to about 360; red is about 325 to about 50; black is about 0 to about 360; yellow is about 80 to about 120; violet is about 270 to about 325; rose is about 0 to about 22; and aqua is about 184 to about 230; and
wherein a second 100 micron thick by 80 mm wide by 120 mm long sample of the cured matrix material exhibits a minimum contrast ratio, as measured via the measurement procedure portion of ASTM D2805-88, having the following values for each respectively colored matrix material: blue is about 42; orange is about 30; green is about 8; brown is about 22; slate is about 24; white is about 36; red is about 30; black is about 3; yellow is about 27; violet is about 16; rose is about 37; and aqua is about 35.

47. The matrix material of claim 46, wherein the optical fibers are colored; wherein the color blend is a pigment blend; and wherein the photoinitiator absorbs light in the wavelength region above about 325 nm.

48. A process for preparing an optical fiber ribbon comprising:
mechanically arranging coated optical fibers in a generally parallel arrangement relative to each other;
applying about said fibers the liquid form of a radiation-curable matrix material comprising:
(a) about 85 to about 99 percent by weight of a base resin comprising one or more acrylated, methacrylated or vinyl functional oligomers and/or monomers;
(b) about 0.1 to about 10 percent by weight of a photoinitiator that absorbs light in the wavelength region above about 400 nm;
(c) about 0.1 to about 10 percent by weight of an opacifier blend, unless the matrix material, when cured, is black, in which case about 0 to about 10 percent by weight of an opacifier blend; and
(d) about 0.01 to about 10 percent by weight of at least one color blend;

wherein the foregoing percentages by weight are based on the total weight of (a), (b), (c) and (d);

curing said matrix material, thereby securing said fibers in said arrangement;

wherein, after curing, the matrix material has a color selected from the group consisting of blue, orange, green, brown, slate, white, red, black, yellow, violet, rose and aqua;

wherein, when a first 100 micron thick by 80 mm wide by 100 mm long sample of the matrix is cured on a glass plate 6 mm thick with a radiation dose of about 0.2 J/cm$^2$, the first 100 micron sample exhibits a percent reacted acrylate unsaturation of more than about 70 percent as measured via FTIR-ATR;

wherein, when placed under a clear 150 micron thick UV-curable coating which is substantially free of chromphores, a 25 micron thick by 75 mm wide by 180 mm long sample of the cured matrix exhibits, as determined by a means for spectrophotometrically analyzing, a hue angle range having the following values for each respectively colored matrix material: blue is about 230 to about 270; orange is about 55 to about 80; green is about 120 to about 185; brown is about 35 to about 80; slate is about 0 to about 360; white is about 0 to about 360; red is about 325 to about 50; black is about 0 to about 360; yellow is about 80 to about 120; violet is about 270 to about 325; rose is about 0 to about 20; and aqua is about 184 to about 230; and wherein a second 100 micron thick by 80 mm wide by 120 mm long sample of the cured matrix material exhibits a minimum contrast ratio, as measured via the measurement procedure portion of ASTM D2805-88, having the following values for each respectively colored matrix material: blue is about 42; orange is about 30; green is about 8; brown is about 22; slate is about 24; white is about 36; red is about 30; black is about 3; yellow is about 27; violet is about 16; rose is about 37; and aqua is about 35.

49. The process of claim 48, wherein the optical fibers are colored; wherein the color blend is a pigment blend; and wherein the photoinitiator has an absorption value of at least 1 at 325 nm when measured at 0.1% concentration by weight in a non-absorbing solvent and path length of 1.0 centimeters.

* * * * *